US012782638B2

(12) United States Patent
Tan et al.

(10) Patent No.: US 12,782,638 B2
(45) Date of Patent: Nov. 3, 2026

(54) REDUCING OPTICAL INTERFERENCE IN INTERFEROMETRIC SENSING SYSTEMS

(71) Applicant: Access Medical Systems, Ltd., Palo Alto, CA (US)

(72) Inventors: Hong Tan, San Jose, CA (US); Jianbo Yao, Shanghai (CN); Genqian Li, Shanghai (CN); Erhua Cao, Shanghai (CN)

(73) Assignee: Access Medical Systems, Ltd., Palo Alto, CA (US)

( * ) Notice: Subject to any disclaimer, the term of this patent is extended or adjusted under 35 U.S.C. 154(b) by 77 days.

(21) Appl. No.: 18/917,989

(22) Filed: Oct. 16, 2024

(65) Prior Publication Data

US 2025/0035846 A1 Jan. 30, 2025

Related U.S. Application Data

(63) Continuation of application No. PCT/US2023/065913, filed on Apr. 18, 2023.

(Continued)

(30) Foreign Application Priority Data

Apr. 19, 2022 (CN) ......................... 202210413194.2

(51) Int. Cl.
*G02B 6/26* (2006.01)
*G01N 21/77* (2006.01)

(52) U.S. Cl.
CPC ............. *G02B 6/262* (2013.01); *G01N 21/77* (2013.01); *G01N 2021/7779* (2013.01); *G01N 2201/0873* (2013.01)

(58) Field of Classification Search
CPC ................................ G02B 6/262; G01N 21/77
See application file for complete search history.

(56) References Cited

U.S. PATENT DOCUMENTS 7,319,525 B2 * 1/2008 Tan .................... G01N 21/7703 356/478
7,394,547 B2 7/2008 Tan et al.

(Continued)

FOREIGN PATENT DOCUMENTS

CN 101915960 A * 12/2010
CN 104880267 A * 9/2015
WO 2021021653 A1 2/2021

OTHER PUBLICATIONS

United States Patent & Trademark Office (USPTO), International Search Report, PCT/US2023/065913, Jul. 31, 2023.

(Continued)

*Primary Examiner* — Kara E. Geisel
(74) *Attorney, Agent, or Firm* — Perkins Coie LLP; Viola Kung; Andrew T. Pettit

(57) ABSTRACT

Introduced here is an approach to mitigating (e.g., lessening or eliminating) the high-frequency interference pattern that is caused by uneven surfaces along the coupling interface formed between the waveguide and probe of an interferometric sensing system. The approach is to reduce the high-frequency interference pattern caused by the interference when a waveguide—for example, in the form of an optical fiber—and a probe are directly coupled to one another. Specifically, the coupling surface of the waveguide can be treated, for example, with sandpaper, sandblasting, or acid etching, to create a frosted surface texture. In operation, the frosted surface scatters the light transmitted through the waveguide, preventing the high-frequency interference pattern from occurring.

9 Claims, 8 Drawing Sheets

Related U.S. Application Data

(60) Provisional application No. 63/363,449, filed on Apr. 22, 2022.

(56) References Cited

U.S. PATENT DOCUMENTS

| | | | | |
|---|---|---|---|---|
| 2003/0134577 | A1 | 7/2003 | Coad | |
| 2004/0013569 | A1 | 1/2004 | Balkus, Jr. et al. | |
| 2006/0093262 | A1 | 5/2006 | Matsumoto et al. | |
| 2011/0134656 | A1 * | 6/2011 | Kitano ................. | A61B 1/0669 362/554 |
| 2011/0305599 | A1 | 12/2011 | Tan et al. | |

OTHER PUBLICATIONS

European Patent Office (EPO), Extended European Search Report, EP No. 23792722.3, Feb. 24, 2026.

* cited by examiner

REDUCING OPTICAL INTERFERENCE IN INTERFEROMETRIC SENSING SYSTEMS

CROSS-REFERENCE TO RELATED APPLICATIONS

This application is a continuation of International Application No. PCT/US2023/65913, filed on Apr. 18, 2023, which claims priority to U.S. Provisional Application No. 63/363,449, filed on Apr. 22, 2022, and Chinese Application No. 202210413194.2, filed on Apr. 19, 2022, each of which is incorporated by reference herein in its entirety.

FIELD OF THE INVENTION

Various embodiments concern approaches to reducing the optical interference experienced by interferometric sensing systems, for example, during a biochemical test in which analyte molecules in a sample bind to a probe.

BACKGROUND

Diagnostic tests based on binding events between analyte molecules and analyte-binding molecules are widely used in medical, veterinary, agricultural, and research applications. These diagnostic tests can be employed to detect whether analyte molecules are present in a sample, the amount of analyte molecules in a sample, or the rate of binding of analyte molecules to the analyte-binding molecules. Together, an analyte-binding molecule and its corresponding analyte molecule form an analyte-anti-analyte binding pair (or simply "binding pair"). Examples of binding pairs include complementary strands of nucleic acids, antigen-antibody pairs, and receptor-receptor binding agents. The analyte can be either member of the binding pair, and the anti-analyte can be the other member of the binding pair.

Historically, diagnostic tests have employed a solid, planar surface having analyte-binding molecules immobilized thereon. Analyte molecules in a sample will bind to these analyte-binding molecules with high affinity in a defined detection zone. In this type of assay, known as a "solid-phase assay," the solid, planar surface is exposed to the sample under conditions that promote binding of the analyte molecules to the analyte-binding molecules. Generally, the binding events are detected directly by measuring changes in mass, reflectivity, thickness, color, or another characteristic indicative of a binding event. For example, when an analyte molecule is labeled with a chromophore, fluorescent label, or radiolabel, the binding events are detectable based on how much, if any, label can be detected within the detection zone. Alternatively, the analyte molecule could be labeled after it has bound to an analyte-binding molecule within the detection zone.

U.S. Pat. No. 5,804,453 discloses a method of determining the concentration of a substance in a sample solution, using an optical fiber having a reagent (i.e., a capturing molecule) coated directly at its distal end to which the substance binds. The distal end is then immersed into the sample containing the analyte. Binding of the analyte to the reagent layer generates an interference pattern and is detected by a spectrometer.

U.S. Pat. No. 7,394,547 discloses a biosensor that includes a first optically transparent element that is mechanical attached to an optical fiber tip with an air gap between them, and a second optically transparent element that serves as the interference layer with a thickness greater than 50 nanometers (nm) is then attached to the distal end of the first optically transparent element. The biolayer is formed on the peripheral surface of the second optically transparent element. An additional reflective surface layer with a thickness between 5-50 nm and a refractive index greater than 1.8 is coated between the interference layer and the first element. The principle of detecting an analyte in a sample based on the changes of spectral interference is described in this reference, which is incorporated herein by reference.

U.S. Pat. No. 7,319,525 discloses a different configuration in which a section of an optical fiber is mechanically attached to a tip connector consisting of one or more optical fibers with an air gap between the proximal end of the optical fiber section and the tip connector. The interference layer and then the biolayer are built on the distal surface of the optical fiber section.

Although prior art provides functionality in utilizing biosensors based on thin-film interferometers, there exists a need for improvements in the performance of these interferometers.

Figure 1A:
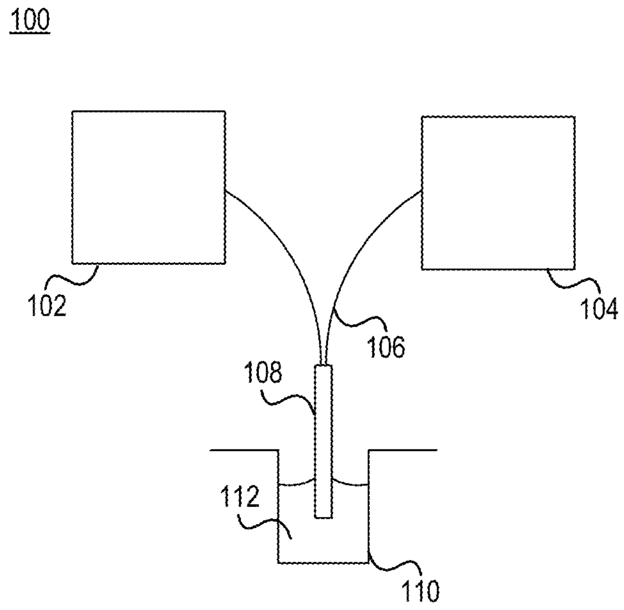
FIG. 1A depicts a biosensor interferometer that includes a light source, a detector, a waveguide, and an optical assembly (also called a "probe").

Embodiments are illustrated by way of example and not limitation in the drawings. While the drawings depict various embodiments for the purpose of illustration, those skilled in the art will recognize that alternative embodiments may be employed without departing from the principles of the technology. Accordingly, while specific embodiments are shown in the drawings, the technology is amenable to various modifications.

DETAILED DESCRIPTION OF THE INVENTION

Definitions

The term "about" means within ±10% of the recited value.

The term "analyte-binding molecule" refers to any molecule capable of participating in a binding reaction with an analyte molecule. Examples of analyte-binding molecules include, but are not limited to, (i) antigen molecules, for use in detecting the presence of antibodies specific against that antigen; (ii) antibody molecules, for use in detecting the presence of antigens; (iii) protein molecules, for use in detecting the presence of a binding partner for that protein; (iv) ligands, for use in detecting the presence of a binding partner; and (v) single-stranded nucleic acid molecules, for use in detecting the presence of nucleic acid molecules.

The term "interferometric sensor" refers to any sensing apparatus upon which a biolayer is formed to produce an interference pattern. One example of an interferometric sensor is a probe designed to be suspended in a solution containing the sample having the analyte molecules. Another example of an interferometric sensor is a slide with a planar surface upon which a biolayer can be formed over the course of a biochemical test.

The term "probe" refers to a monolithic substrate having an aspect ratio (length-to-width) of at least 2 to 1 with a thin-film layer coated on the sensing side.

The term "monolithic substrate" refers to a solid piece of material having a uniform composition, such as glass, quartz, or plastic, with one refractive index.

The term "waveguide" refers to a device designed to confine and direct the propagation of electromagnetic waves as light. One example of a waveguide is a flexible, transparent fiber made by drawing glass, plastic, or another transparent material to a small diameter (e.g., roughly that of a human hair). These waveguides are commonly called "optical fibers." Another example of a waveguide is a metal tube for channeling ultrahigh-frequency waves. Waveguides could also take the form of ducts or coaxial cables.

Introduction

Figure 1B:
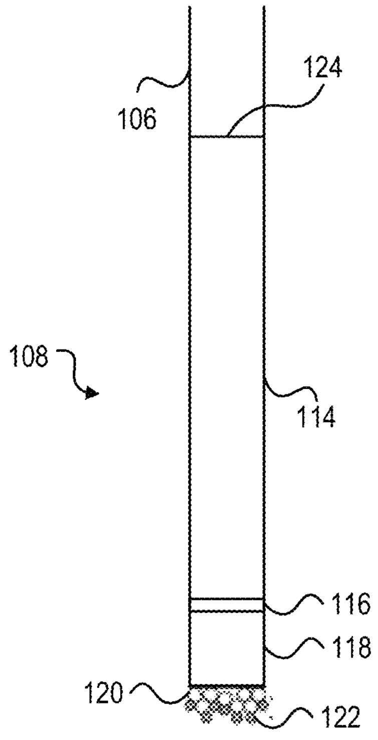
FIG. 1B depicts an example of a probe.

Several entities have developed interferometric sensing systems (also called "interferometers" or simply "systems") designed to conduct biochemical tests. FIGS. 1A-B illustrate one example of such a system. Specifically, FIG. 1A depicts an interferometer 100 that includes a light source 102, a detector 104, a waveguide 106, and an optical assembly 108 (also called a "probe"). The probe 108 may be connected to the waveguide 106 via a coupling medium.

The light source 102 may emit light that is guided toward the probe 108 by the waveguide 106. For example, the light source 102 may be a light-emitting diode (LED) that is configured to produce light over a range of at least 50 nanometers (nm), 100 nm, or 150 nm within a given spectrum (e.g., 400 nm or less to 700 nm or greater). Alternatively, the interferometer 100 may employ a plurality of light sources having different characteristic wavelengths, such as LEDs designed to emit light at different wavelengths in the visible range. The same function could be achieved by a single light source with suitable filters for directing light with different wavelengths onto the probe 108.

The detector 104 is preferably a spectrometer, such as an Ocean Optics USB4000, that is capable of recording the spectrum of interfering light received from the probe 108. Alternatively, if the light source 102 operates to direct different wavelengths onto the probe 108, then the detector 104 can be a simple photodetector capable of recording intensity at each wavelength. In another embodiment, the detector 104 can include multiple filters that permit detection of intensity at each of multiple wavelengths.

The waveguide 106 can be configured to transport light emitted by the light source 102 to the probe 108, and then transport light reflected by surfaces within the probe 108 to the detector 104. In some embodiments the waveguide 106 is a bundle of optical fibers (e.g., single-mode fiber optic cables), while in other embodiments the waveguide 106 is a multi-mode fiber optic cable.

As shown in FIG. 1B, the probe 108 can include a monolithic substrate 114, a thin-film layer (also referred to as an "interference layer"), and a biomolecular layer (also referred to as a "biolayer") that comprises analyte molecules 122 that have bound to analyte-binding molecules 120. The monolithic substrate 114 comprises a transparent material through which light can travel. The interference layer also comprises a transparent material through which light can travel. When light emitted by the light source 102 is shone on the probe 108, the proximal surface of the interference layer may act as a first reflecting surface and the biolayer may act as a second reflecting surface. As further described below, light reflected by the first and second reflecting surfaces may form an interference pattern that can be monitored by the interferometer 100.

The interference layer normally includes multiple layers that are combined in such a manner to improve the detectability of the interference pattern. Here, for example, the interference layer comprises a tantalum pentoxide ($Ta_2O_5$) layer 116 and a silicon dioxide ($SiO_2$) layer 118. The tantalum pentoxide layer 116 may be thin (e.g., on the order of 10-40 nm) since its main purpose is to improve reflectivity at the proximal surface of the interference layer. Meanwhile, the silicon dioxide layer 118 may be comparatively thick (e.g., on the order of 650-900 nm) since its main purpose is to increase the distance between the first and second reflecting surfaces.

To perform a biochemical test, the probe 108 can be suspended in a microwell 110 (or simply "well") that includes a sample 112. Analyte molecules 122 in the sample 112 will bind to the analyte-binding molecules 120 along the distal end of the probe 108 over the course of the biochemical test, and these binding events will result in an interference pattern that can be observed by the detector 104. The interferometer 100 can monitor the thickness of the biolayer formed along the distal end of the probe 108 by detecting shifts in a phase characteristic of the interference pattern.

As shown in FIG. 1B, the waveguide 106 may be directly coupled to the proximal end of the probe 108, so as to eliminate any gaps therebetween. For example, in embodiments where the waveguide 106 comprises an optical fiber, the proximal end of the probe 108 can be coupled directly to the optical fiber. When these surfaces—namely, the distal surface of the waveguide 106 and the proximal surface of the probe 108—are coupled to one another, unparallel surfaces at the coupling interface 124 can cause a high-frequency interference pattern that may be detachable at the detector 104. As mentioned above, the interferometer 100 is responsible for monitoring the interference pattern caused by light reflecting at the first and second reflecting surfaces of the probe 108.

Figure 1C:
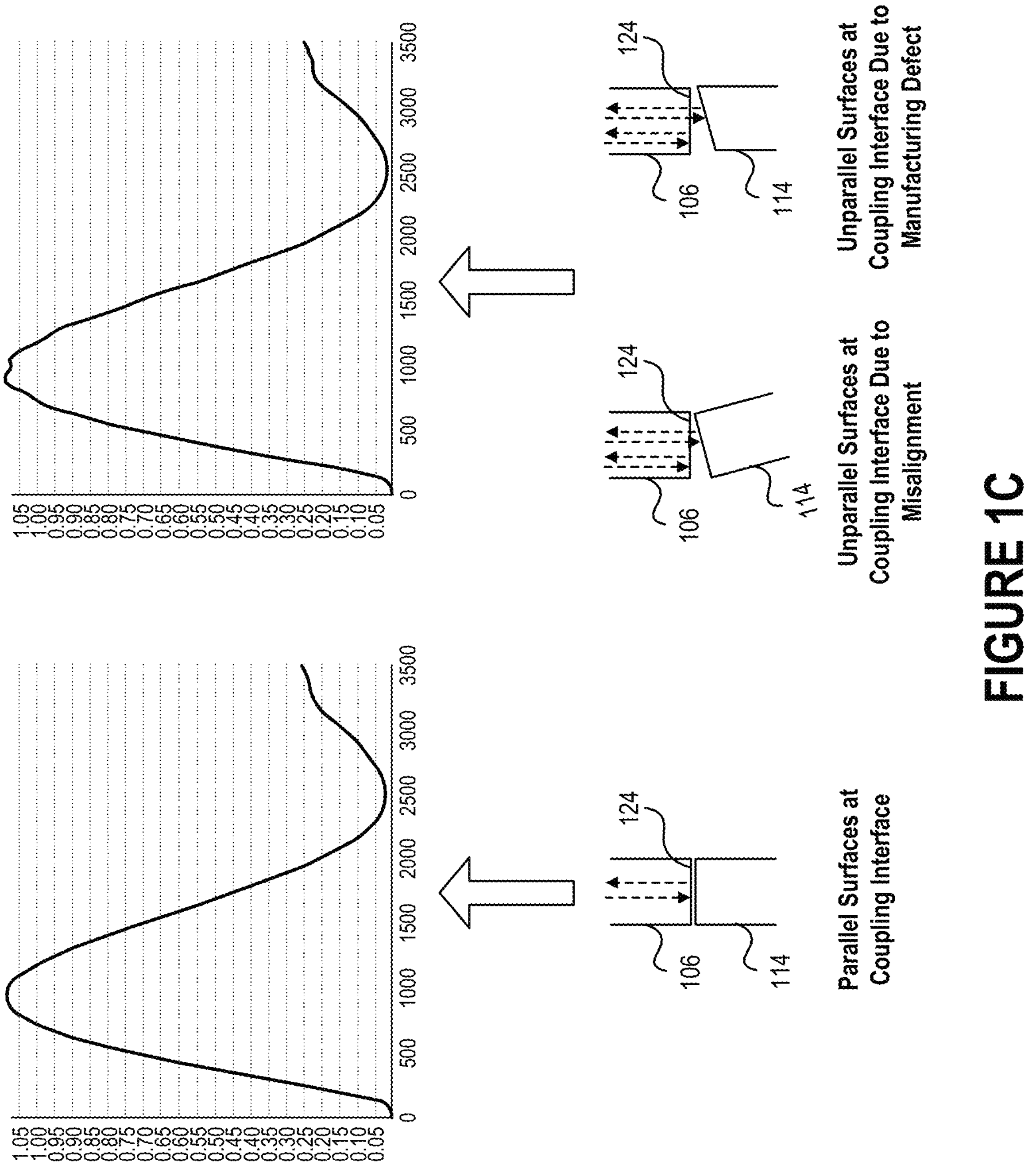
FIG. 1C illustrates how the interference pattern monitored by the detector will vary in two different situations, namely, where the surfaces at a coupling interface between the waveguide and probe are parallel and where the surfaces at the coupling interface are not parallel.

FIG. 1C illustrates how the interference pattern monitored by the detector 104 will vary in two different situations, namely, where the surfaces at the coupling interface 124 are parallel to one another and where the surfaces at the coupling interface 124 are not parallel to one another. Ideally, the surfaces at the coupling interface 124 are directly adjacent to one another and substantially flush against one another as shown in the leftmost illustration in FIG. 1C. This rarely happens in practice, however, as small separations (e.g., on the order of nanometers) are unavoidable in some scenarios. As an example, the surfaces may be unparallel due to misalignment as shown in the middle illustration in FIG. 1C. As another example, the surfaces may be unparallel due to an imperfection (e.g., a cavity formed along the surface, an angled cut along the surface, etc.) as shown in the rightmost illustration in FIG. 1C. Unparallel surfaces tend to result in a gap along a portion of the coupling interface 124; this gap of varying size can influence how light permeates the coupling interface 124 (e.g., by affecting how much light leaving the distal end of the waveguide 106 actually permeates the proximal end of the probe 108).

Unparallel surfaces along the coupling interface 124 can result in the generation of a high-frequency interference pattern as mentioned above. As an illustrative example, for white light in the visible portion of the electromagnetic spectrum, the high-frequency interference pattern tends to occur when the unparallel surfaces at the coupling interfaces are less than about two micrometers (μm) apart. As such, this problem tends to present itself only when the surfaces forming the coupling interface 124 are quite close to one another. The high-frequency interference pattern resulting from unparallel surfaces can add to the monitored interference pattern, causing inaccuracy when calculating the phase shift since the high-frequency interference pattern is roughly stationary while the monitored inference pattern shifts. Simply put, the monitored interference pattern has a smooth—and therefore consistent and predictable—form in comparison to the monitored interference in combination with the high-frequency interference pattern. The high-frequency interference pattern can degrade the monitored interference pattern as the magnitude may "jump" as shown in the rightmost plot in FIG. 1C. Because accuracy of the biochemical test depends on the wavelength shift being precisely known, these unexpected and unpredictable "jumps" can affect the results. As an example, a "jump" may cause it to appear as though the combined signal experienced a peak or trough either sooner or later than actually occurred.

Introduced here is an approach to mitigating (e.g., lessening or eliminating) the high-frequency interference pattern that is caused by uneven surfaces along the coupling interface formed between the waveguide and probe of an interferometric sensing system. Said another way, the approach is intended to reduce the high-frequency interference pattern caused by the interference when a waveguide—for example, in the form of an optical fiber—and a probe are directly coupled to one another. Note that the phrases "directly coupled" and "coupled with no air gap" may be used to refer to a scenario where the waveguide and probe physically contact one another along at least part of the respective surfaces or where the waveguide and probe are so close to one another that refraction in the gap established therebetween (e.g., generally no more than five μm) does not meaningfully impact the light traveling toward the distal end of the probe or returning from the distal end of the probe. When the respective surfaces are pushed together along a coupling interface, there are generally contact points and non-contact points. Non-contact points may be due to the roughing of the surface of the waveguide, and therefore may be referred to as "voids" along the coupling interface. While these voids are generally not intended, these voids tend to exist due to the roughened surface being located along the coupling interface.

Specifically, the coupling surface of the waveguide can be treated, for example, with sandpaper, sandblasting, or acid etching, to create a frosted surface texture. In operation, the frosted surface scatters the light emitted through the waveguide, preventing the high-frequency interference pattern from occurring. The surface roughness parameter $R_a$ may vary depending on the nature of the light emitted through the waveguide. However, for applications that use white light, it has been found that the preferred surface roughness parameter $R_a$ is between about 0.5 μm and 10 μm.

Note that while embodiments of the interferometric sensing system may be described in the context of a waveguide with a frosted distal surface, a comparable approach may be employed to make the other coupling surface—namely, the proximal surface of the probe—frosted too. To prevent the high-frequency interference pattern, at least one of the surfaces forming the coupling interface may be roughened and frosted, though both surfaces could be roughened and frosted.

Moreover, embodiments of the interferometric sensing system may be described in the context of a probe designed to be suspended within a solution containing a sample for the purpose of illustration. However, those skilled in the art will recognize that these features are equally applicable to other sensing surfaces, such as planar surfaces (e.g., a slide) upon which a biolayer is formed by flowing a solution over the planar surface over the course of a biochemical test.

Probe Overview

Figure 2:
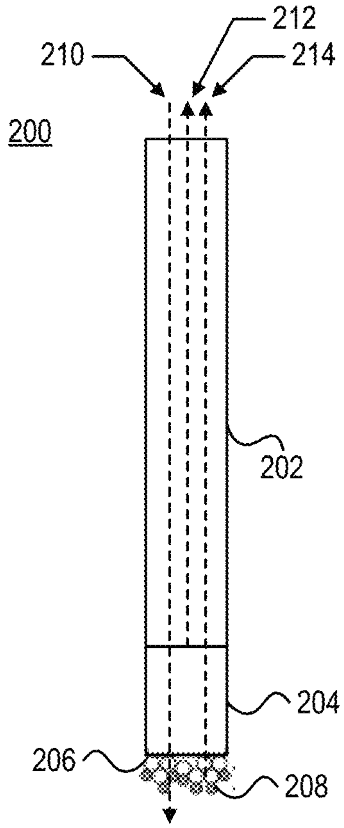
FIG. 2 depicts an example of a probe in accordance with various embodiments.

FIG. 2 depicts an example of a probe 200 in accordance with various embodiments. The probe 200 includes an interference layer 204 that is secured along the distal end of a monolithic substrate 202. Analyte-binding molecules 206 can be deposited along the distal surface of the interference layer 204. Over the course of a biochemical test, a biolayer will form as analyte molecules 208 in a sample bind to the analyte-binding molecules 206.

As shown in FIG. 2, the monolithic substrate 202 has a proximal surface (also referred to as a "coupling side") that can be coupled to, for example, a waveguide of an interferometer and a distal surface (also referred to as a "sensing side") on which additional layers are deposited. Generally, the monolithic substrate 202 has a length of at least 3 millimeters (mm), 5 mm, 10 mm, or 15 mm. In a preferred embodiment, the aspect ratio (length-to-width) of the monolithic substrate 202 is at least 5 to 1. In such embodiments, the monolithic substrate 202 may be said to have a columnar form. The cross section of the monolithic substrate 202 may be a circle, oval, square, rectangle, triangle, pentagon, etc. The monolithic substrate 202 preferably has a refractive index that is substantially higher than the refractive index of the interference layer 204, such that the proximal surface of the interference layer 204 effectively reflects light directed onto the probe 200. The preferred refractive index of the monolithic substrate may be higher than 1.5, 1.8, or 2.0. Accordingly, the monolithic substrate 202 may comprise a high-refractive-index material such as glass (refractive index of 2.0), though some embodiments of the monolithic substrate 202 may comprise a low-refractive-index material such as quartz (refractive index of 1.46) or plastic (refractive index of 1.32-1.49).

The interference layer 204 is comprised of at least one transparent material that is coated on the distal surface of the monolithic substrate 202. These transparent material(s) are deposited on the distal surface of the monolithic substrate 202 in the form of thin films ranging in thickness from fractions of a nanometer (e.g., a monolayer) to several micrometers. The interference layer 204 may have a thickness of at least 500 nm, 700 nm, or 900 nm. An exemplary thickness is between 500-5,000 nm (and preferably 800-1,200 nm). Here, for example, the interference layer 204 has a thickness of approximately 900-1,000 nm, or 940 nm.

In contrast to conventional probes, the interference layer 204 has a substantially similar refractive index as the biolayer. This ensures that the reflection from the distal end of the probe 200 is predominantly due to the analyte molecules 208 rather than the interface between the interference layer 204 and the analyte-binding molecules 206. Generally, the biolayer has a refractive index of approximately 1.36, though this may vary depending on the type of analyte-binding molecules (and thus analyte molecules) along the distal end of the probe 200.

In some embodiments the interference layer 204 is comprised of magnesium fluoride ($MgF_2$), while in other embodiments the interference layer 204 is comprised of potassium fluoride (KF), lithium fluoride (LiF), sodium fluoride (NaF), lithium calcium aluminum fluoride ($LiCaAlF_6$), strontium fluoride ($SrF_2$), aluminum fluoride ($AlF_3$), sulfur hexafluoride ($SF_6$), etc. Magnesium fluoride has a refractive index of 1.38, which is substantially identical to the refractive index of the biolayer formed along the distal end of the probe 200. For comparison, the interference layer of conventional probes is normally comprised of silicon dioxide, and the refractive index of silicon dioxide is approximately 1.4-1.5 in the visible range. Because the interference layer 204 and biolayer have similar refractive indexes, light will experience minimal scattering as it travels from the interference layer 204 into the biolayer and then returns from the biolayer into the interference layer 204.

During a biochemical test, the probe 200 can be suspended within a cavity (e.g., a well) that includes a sample. Over the course of the biochemical test, a biolayer will form along the distal end of the probe 200 as analyte molecules 208 bind to the analyte-binding molecules 206. When light is shone on the probe 200, the proximal surface of the interference layer 204 may act as a first reflecting surface and the distal surface of the biolayer may act as a second reflecting surface. The presence, concentration, or binding rate of analyte molecules 208 to the probe 200 can be estimated based on the interference of beams of light reflected by these two reflecting surfaces. As analyte molecules 208 attach to (or detach from) the analyte-binding molecules 206, the distance between the first and second reflecting surfaces will change. Because the dimensions of all other components in the probe 200 remain the same, the interference pattern formed by the light reflected by the first and second reflecting surfaces is phase shifted in accordance with changes in biolayer thickness due to binding events.

In operation, an incident light signal 210 emitted by a light source is transported through the monolithic substrate 202 toward the biolayer. Within the probe 200, light will be reflected at the first reflecting surface resulting in a first reflected light signal 212. Light will also be reflected at the second reflecting surface resulting in a second reflected light signal 214. The second reflecting surface initially corresponds to the interface between the analyte-binding molecules 206 and the sample in which the probe 200 is immersed. As binding occurs during the biochemical test, the second reflecting surface becomes the interface between the analyte molecules 208 and the sample.

Figure 4A:
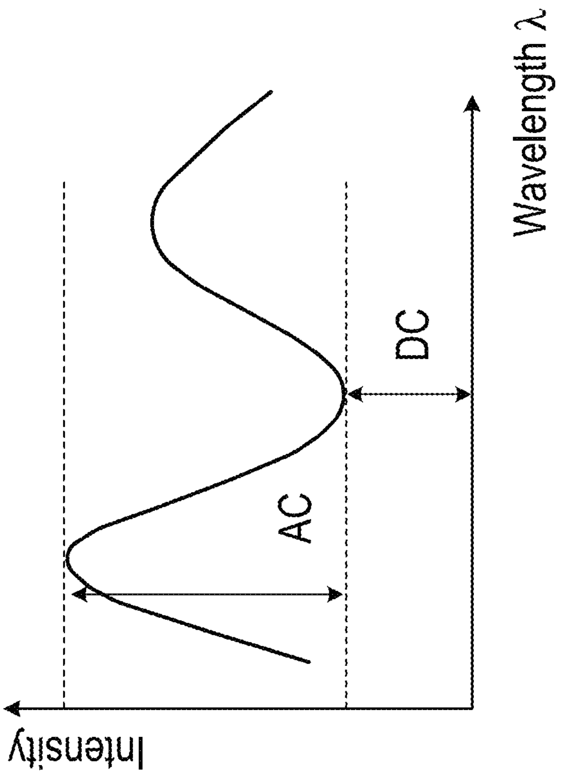
FIGS. 4A-B illustrate the principles of detection in a thin-film interferometer.
Figure 4B:
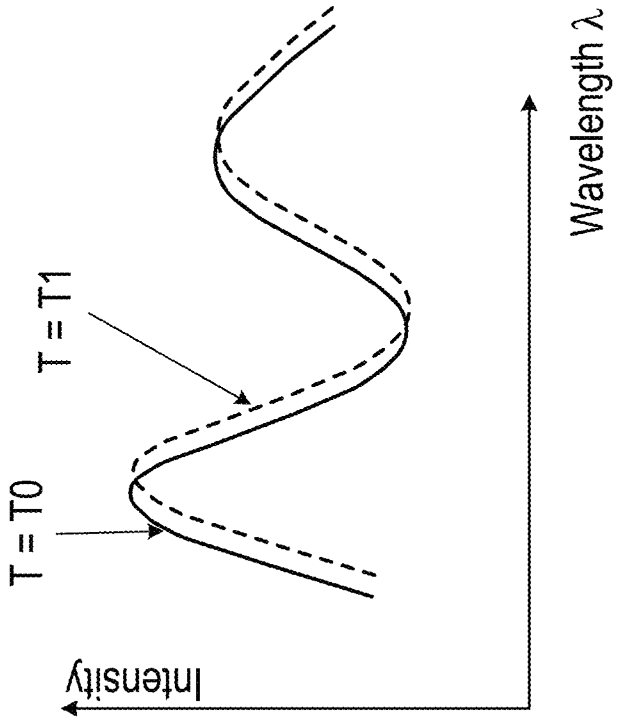

The first and second reflected light signals 212, 214 form a spectral interference pattern, as shown in FIG. 4A. When analyte molecules 208 bind to the analyte-binding molecules 206 on the distal surface of the interference layer 204, the optical path of the second reflected light signal 214 will lengthen. As a result, the spectral interference pattern shifts from T0 to T1 as shown in FIG. 4B. By measuring the phase shift continuously in real time, a kinetic binding curve can be plotted as the amount of shift versus the time. The association rate of an analyte molecule to an analyte-binding molecule immobilized on the distal surface of the interference layer 204 can be used to calculate analyte concentration in the sample. Hence, the measure of the phase shift is the detection principle of a thin-film interferometer.

Referring to FIG. 4A, the performance of a thin-film interferometer can be improved by maximizing the alternating current (AC) component and minimizing the direct current (DC) offset. Said another way, performance of a thin-film interferometer can be improved by increasing the AC-to-DC ratio since the AC component represents the signal of interest while the DC offset represents noise. To achieve these objectives, one can (1) increase the efficiency with which the incident light signal 210 and reflected light signals 212, 214 travel through the probe 200; (2) increase the coupling efficiency between the light source and probe 200; and/or (3) increase the coupling efficiency between the spectrometer and probe 200.

Directly coupling the distal end of the waveguide (not shown) to the proximal end of the probe 200 accomplishes the second and third of these goals, namely, by preventing the inadvertent scattering of light leaving those surfaces. Note, however, that directly coupling those surfaces to one another can result in other problems as discussed above.

Figure 3:
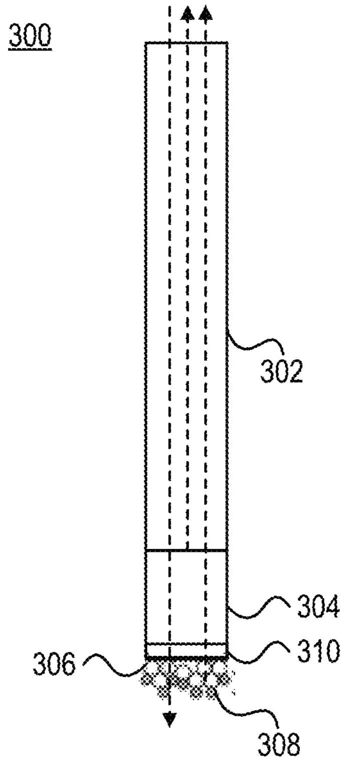
FIG. 3 depicts another example of a probe in accordance with various embodiments.

FIG. 3 depicts another example of a probe 300 in accordance with various embodiments. Probe 300 of FIG. 3 may be substantially similar to probe 200 of FIG. 2. Here, however, the probe 300 includes an adhesion layer 310 that is deposited along the distal surface of the interference layer 304 affixed to the monolithic substrate 302. While the interference layer 304 is present in most embodiments, the adhesion layer 304 is generally optional, and therefore may only be included if greater adhesion of analyte-binding molecules 306 is desired or needed.

The adhesion layer 310 may comprise a material that promotes adhesion of the analyte-binding molecules 306. One example of such a material is silicon dioxide. The adhesion layer 310 is generally very thin in comparison to the interference layer 304, so its impact on light traveling toward, or returning from, the biolayer will be minimal. For example, the adhesion layer 310 may have a thickness of approximately 3-10 nm, while the interference layer 304 may have a thickness of approximately 800-1,000 nm. The biolayer formed by the analyte-binding molecules 306 and analyte molecules 308 will normally have a thickness of several nm. Much like probe 200 of FIG. 2, probe 300 of FIG. 3 may also have a reflection layer (not shown) deposited along the distal end of the monolithic substrate 302 such that the reflection layer is positioned between the monolithic substrate 302 and interference layer 304. The thickness of the reflection layer may be about the same as the thickness of the adhesion layer 310.

As mentioned above, these features are equally applicable to sensing surfaces having other forms. One example of such a sensing surface is a slide (also referred to as a "chip") with a planar surface upon which a biolayer is formed by flowing a solution over the planar surface over the course of a biochemical test. Several examples of planar surfaces are discussed below with reference to FIGS. 5-6.

Figure 5:
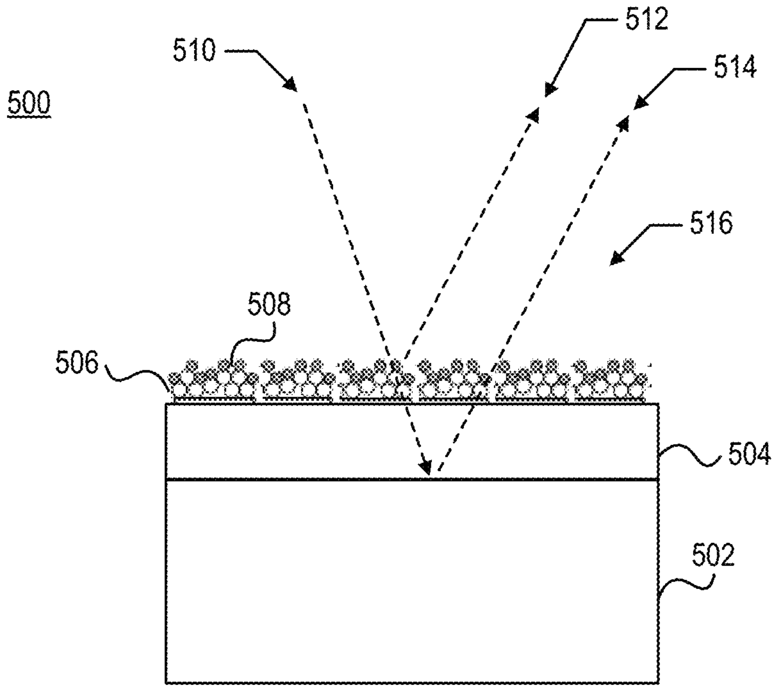
FIG. 5 depicts an example of a slide in accordance with various embodiments.

FIG. 5 depicts an example of a slide 500 in accordance with various embodiments. The slide 500 includes a substrate 502 upon which an interference layer 504 is deposited. In some embodiments the interference layer 504 is deposited along the entire upper surface of the substrate 502, while in other embodiments the interference layer 504 is deposited along a portion of the upper surface of the substrate 502. For example, the interference layer 504 may be deposited within channels or wells formed within the upper surface of the substrate 502. As discussed above, monolithic substrates 202, 302 of FIGS. 2-3 are generally much larger in height than in width. Here, however, the inverse may be true. In fact, the width of the substrate 502 may be larger than the length by a factor of 5, 7.5, 10, or 20. As an example, the substrate may be approximately 75 by 26 mm with a height/thickness of roughly 1 mm.

Over the course of a biochemical test, analyte molecules 508 can bind to analyte-binding molecules 506 that have been secured along the upper surface of the interference layer 504 to form a biolayer. To establish the thickness of the biolayer, light can be shone at the upper surface of the slide 500 as shown in FIG. 5. More specifically, an incident light signal 510 emitted by a light source can be shown at the biolayer that has formed along the upper surface of the slide 500. This may require that the incident light signal 510 travel through ambient media 516, which may be vacuum, air, or solution. The incident light signal 510 will be reflected at a first reflecting surface resulting in a first reflected light signal 512. The first reflecting surface may be representative of the interface between the biolayer and ambient media 516. The incident light signal 510 will also be reflected at a second reflecting surface resulting in a second reflected light signal 514. The second reflecting surface may be representative of the interface between the interference layer 504 and substrate 502. As discussed above, the first and second reflected light signals 512, 514 form a spectral interference pattern that can be analyzed to establish the thickness of the biolayer. Note that because the incident light signal 510 is not transported through the substrate 502, the substrate 502 could be either transparent or non-transparent (e.g., opaque).

Figure 6:
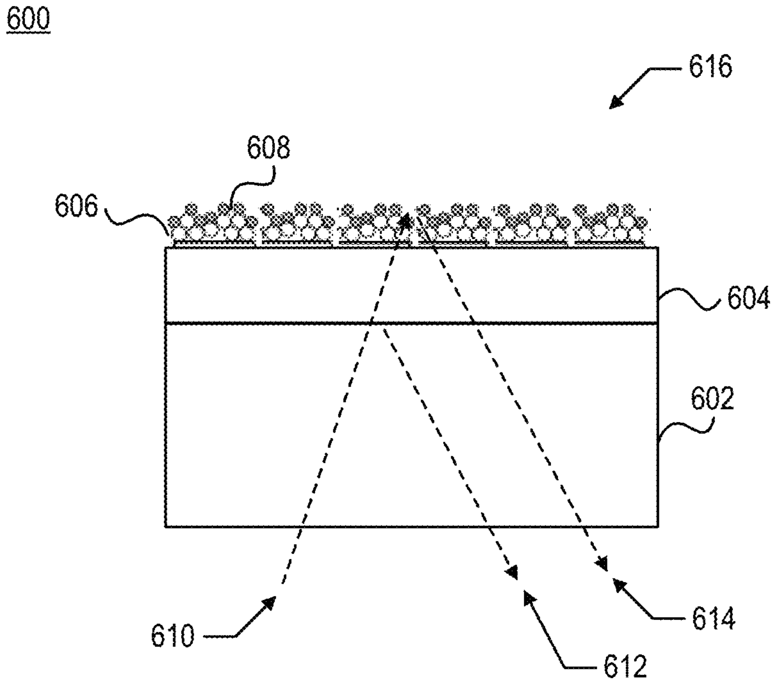
FIG. 6 depicts another example of a slide in accordance with various embodiments.

FIG. 6 depicts another example of a slide 600 in accordance with various embodiments. Slide 600 of FIG. 6 may be largely similar to slide 500 of FIG. 5. Thus, the slide 600 may include a substrate 602 upon which an interference layer 604 and analyte-binding molecules 606 are deposited. Over the course of a biochemical test, analyte molecules 608 can bind to the analyte-binding molecules 606 to form a biolayer.

Here, however, the incident light signal 610 is shown at the lower surface of the slide 600. In operation, the incident light signal 610 is transported through the substrate 602 toward the biolayer. Within the slide 600, light will be reflected at a first reflecting surface resulting in a first reflected light signal 612. The first reflecting surface may be representative of the interface between the interference layer 604 and substrate 602. Light will also be reflected at a second reflecting surface resulting in a second reflected light signal 614. The second reflecting surface may be representative of the interface between the biolayer and ambient media 616. As discussed above, the first and second reflected light signals 612, 614 form a spectral interference pattern that can be analyzed to establish the thickness of the biolayer.

While not shown in FIGS. 5-6, the slides 500, 600 could include a reflection layer that is disposed between the substrate 502, 602 and interference layer 504, 604 to improve reflectivity along that interface and/or an adhesion layer that is disposed along the upper surface of the interference layer 504, 604 to secure the analyze-binding molecules 506, 606.

Mitigating Formation of High-Frequency Interference Along Coupling Surface

Figure 7:
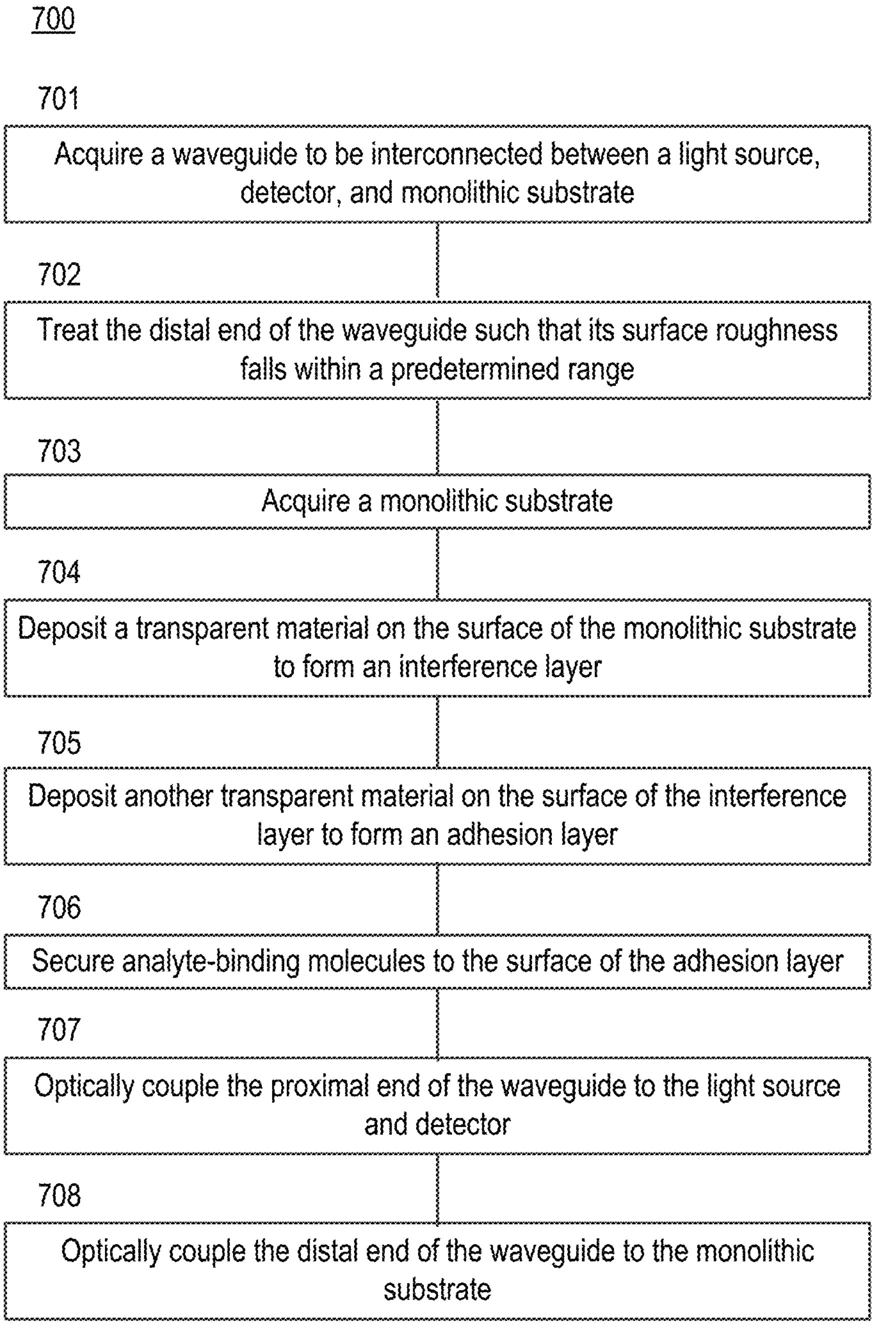
FIG. 7 depicts a flow diagram of a process for manufacturing an interferometric sensing system.

FIG. 7 depicts a flow diagram of a process for manufacturing an interferometric sensing system. Initially, a manufacturer can acquire a waveguide to be interconnected between a light source, detector, and monolithic substrate (step 701). For example, the manufacturer may select the waveguide from among multiple waveguides designed for different wavelengths. The waveguide may be an optical fiber. As shown in FIGS. 1A-B, the waveguide may have opposing ends—namely, a first end (also called a "proximal end") that is to be optically coupled to the light source and detector and a second end (also called a "distal end") that is to be optically coupled to the monolithic substrate.

The manufacturer can then treat the distal end of the waveguide such that its surface roughness falls within a predetermined range (step 702) that is defined by a first surface roughness parameter $R_1$ and a second surface roughness parameter $R_2$ that is higher than the first surface roughness parameter $R_1$. This can occur in various ways.

For example, the manufacturer may roughen the distal end of the waveguide with a coated abrasive or another rough surface. At a high level, a coated abrasive is a product that includes a layer of abrasive grain attached to a substrate such as paper, cloth, fiber, or combinations thereof. One example of a coated abrasive is sandpaper, which generally consists of one or more sheets of paper, cloth, or another substrate with abrasive material—like sand—adhered to one side. Coated abrasives are available in a variety of forms, including sheets, disks, rolls, and belts. Commonly used abrasive grains include sand, aluminum oxide, zirconium, ceramic, silicon carbide, and garnet. To form the abrasive grains, crude grains are normally crushed and then separated by size using calibrated screens. The sizes (also called "grits") can range from P12 (very coarse) to P2500 (very fine). After the abrasive grains have been separated by size, the abrasive grains can be attached to a substrate using various bonding techniques. Because only slight roughening of the distal end of the waveguide is needed, larger grit number (and therefore, smaller abrasive grain size) is generally preferred. For example, the distal end of the waveguide may be roughened with a coated abrasive having a grit number higher than P400, P800, P1000, P1200, or P2000. Coated abrasives having a grit number of P400, P500, or P600 are generally called "extra fine" coated abrasives, coated abrasives having a grit number of P800, P1000, or P1200 are generally called "super fine" coated abrasives, and coated abrasives having a grit number of P1500, P2000, or P2500 are generally called "ultra fine" coated abrasives. Depending on the desired roughness, the manufacturer may choose any suitable extra fine, super fine, or ultra fine coated adhesive. Note that these examples are provided solely for the purpose of illustration; in some embodiments, a coarser coated adhesive may be desirable.

As another example, the manufacturer may roughen the distal end of the waveguide via a sandblasting process. The term "sandblasting" is commonly used to refer to the process by which a surface—like the distal end of the waveguide—is roughened by impelling a stream of abrasive material against that surface using a fluid (e.g., water or air). Normally, sandblasting is performed under high pressure to roughen a smooth surface while also removing any excess particles (e.g., parts of the surface that are "blasted" off), though sandblasting could also be used to smoothen rough surfaces. Various materials could be used as the abrasive material, including sand, aluminum oxide, silicon carbide, garnet, and walnut husks. The size of the abrasive material may be selected to slightly roughen the distal end of the waveguide (e.g., to obtain surface roughness between 0.5 μm and 10 μm).

As another example, the manufacturer may roughen the distal end of the waveguide via an acid etching process. The term "acid etching" is commonly used to refer to the process by which a surface—like the distal end of the waveguide—is treated with an acid (e.g., hydrofluoric acid) to achieve a slight roughening, leading to a frosted appearance. Normally, a resist is applied to the surface before it is dipped into the acid. Once in the acid, the portion of the surface that is not covered with resist is etched away, changing its appearance and structure. The manufacturer could apply resist along the sides of the waveguide to ensure that only the surface along the distal end is etched, or the manufacturer may not apply resist at all since the sides of the waveguide may be covered (e.g., by a protective sheath).

At a high level, the distal end of the waveguide is roughened to create a frosted surface texture, regardless of the approach employed by the manufacturer. As mentioned above, in operation, the frosted surface texture scatters light emitted through the distal end of the waveguide.

The manufacturer can then acquire a monolithic substrate (step 703). For example, the manufacturer may select the monolithic substrate from amongst multiple monolithic substrates designed for different biochemical tests, analyte-binding molecules, etc. The preferred refractive index of the monolithic substrate may be higher than 1.3, 1.5, 1.8, or 2.0. Accordingly, the monolithic substrate acquired by the manufacturer may comprise a high-refractive-index material, such as glass (refractive index of 2.0), or a low-refractive-index material, such as quartz (refractive index of 1.46) or plastic (refractive index of 1.32-1.49). As discussed above, in some embodiments the monolithic substrate has a columnar form (e.g., monolithic substrates 202, 302 of FIGS. 2-3) while in other embodiments the monolithic substrate has a planar form (e.g., monolithic substrates 502, 602 of FIGS. 5-6).

Note that, in some embodiments, the proximal end of the monolithic substrate to which the distal end of the waveguide is to be connected may also be treated. Said another way, the proximal end of the monolithic substrate could be treated such that its surface roughness falls within a predetermined range. Generally, the proximal end of the monolithic substrate is treated similarly to the distal end of the waveguide, and therefore, the predetermined range may be defined by the same surface roughness parameters, namely, $R_1$ and $R_2$, as the distal end of the waveguide.

Then, the manufacturer can deposit a transparent material on the surface of the monolithic substrate to form an interference layer (step 704). For example, the transparent material may be deposited onto the distal surface of the monolithic substrate in the form of a thin film ranging in thickness from fractions of a nanometer (e.g., a monolayer) to several micrometers. Normally, the interference layer has a thickness of at least 500 nm, 700 nm, or 900 nm. An exemplary thickness is between 500-5,000 nm (and preferably 800-1,200 nm).

In some embodiments, the manufacturer deposits another transparent material on the surface of the interference layer to form an adhesion layer (step 705). The adhesion layer may comprise a material that promotes adhesion of analyte-binding molecules. One example of such a material is silicon dioxide. The adhesion layer is generally very thin in comparison to the interference layer, so its impact on light traveling along the interferometric sensor will be minimal. For example, the adhesion layer may have a thickness of approximately 3-10 nm.

Thereafter, the manufacturer can secure analyte-binding molecules to the surface of the adhesion layer (step 706). As discussed above, a layer of analyte-binding molecules can be formed under conditions in which the surface of the interferometric sensor (e.g., the distal end of a probe, or the distal surface of a planar chip) is densely coated. This ensures that as analyte molecules bind to the analyte-binding molecules over the course of a biochemical test, these binding events result in a change in the thickness of the biolayer rather than filling in the layer of analyte-binding molecules. The layer of analyte-binding molecules can be a monolayer or a multi-layer matrix.

Thereafter, the manufacturer can optically couple the proximal end of the waveguide to the light source and detector (step 707). Similarly, the manufacturer can optically couple the distal end of the waveguide to the monolithic substrate (step 708), so as to form a roughly contiguous structure with no gap therebetween. As mentioned above, while small voids may occur along the interface between the waveguide and monolithic substrate due to roughening, these components may be coupled to one another such that the distal end of the waveguide contacts the proximal end of the monolithic substrate in at least one location.

Accordingly, the interferometric sensing system can include (i) a monolithic substrate that has first and second surfaces arranged substantially parallel to one another at opposite ends of the monolithic substrate, (ii) an interference layer that is coated on the second surface of the monolithic substrate, (iii) a layer of analyte-binding molecules that is coated on the interference layer, and (iv) a waveguide having a roughened surface that is coupled to the first surface of the monolithic substrate. In operation, a first interface between the monolithic substrate and the interference layer can act as a first reflecting surface when light is shone through the waveguide onto the monolithic substrate, and a second interface between a biolayer formed by analyte molecules in a sample binding to the analyte-binding molecules and a solution containing the sample can act as a second reflecting surface when the light is shone through the waveguide onto the monolithic substrate.

Unless contrary to physical possibility, it is envisioned that the steps described above may be performed in various sequences and combinations. For example, in embodiments where the monolithic substrate is disposable, step 704 may be performed each time that a biochemical test is performed. Accordingly, steps 701-707 may be performed by the manufacturer, while step 708 may be performed by the manufacturer or another entity or person. It is also envisioned that some steps described may not be performed at all. For example, the manufacturer may choose not to create an adhesion layer along the distal surface of the interference layer. In such embodiments, step 705 may not be performed, and therefore the analyte-binding molecules may be secured directly to the distal surface of the interference layer.

Additional steps may also be performed.

For example, the manufacturer may roughen the proximal end of the monolithic substrate similar to how the distal end of the waveguide is roughened in step 702, as discussed above. Note, however, that the proximal end of the monolithic substrate does not necessarily need to be roughened in the same manner as the distal end of the waveguide. For example, the distal end of the waveguide may be roughed via a sandblasting process, while the proximal end of the monolithic substrate may be roughened via an acid etching process. Similarly, the proximal end of the monolithic substrate does not necessarily need to be roughened to the same degree as the distal end of the waveguide. The proximal end of the monolithic substrate could be roughened more or less than the distal end of the waveguide.

As another example, the manufacturer may form a reflection layer on the surface of the monolithic substrate. As discussed above, the reflection layer may comprise a transparent material that has a higher refractive index than the monolithic substrate and the interference layer. Because of its location, this transparent material may be deposited onto the surface of the monolithic substrate before the interference layer is formed (i.e., before step 702 is performed). As another example, the manufacturer may cure the interference layer (e.g., using heat, air, radiation, etc.) before forming the adhesion layer. Similarly, the manufacturer may cure (i) the reflection layer before securing the adhesion layer thereto and/or (ii) the adhesion layer before securing the analyte-binding molecules thereto. As another example, the manufacturer may polish first and second surfaces of the monolithic substrate that are arranged substantially parallel to one another at opposite ends of the monolithic substrate. Polishing may be performed to improve adhesion of the interference layer to the monolithic substrate.

Figure 8A:
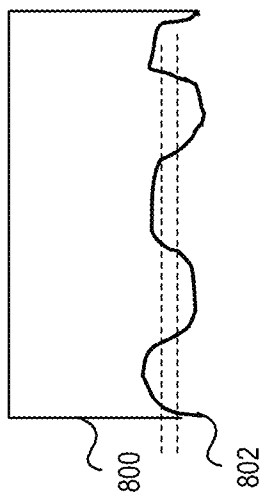
FIG. 8A illustrates how the surface roughness parameter $R_a$ of a given surface can be arithmetic average roughness.

FIG. 8A illustrates how the surface roughness parameter $R_a$ of a given surface 800—for example, the distal surface of the waveguide or the proximal surface of the monolithic substrate—can be arithmetic average roughness, which is defined as an average of profile height deviation from the mean line 802.

Figure 8B:
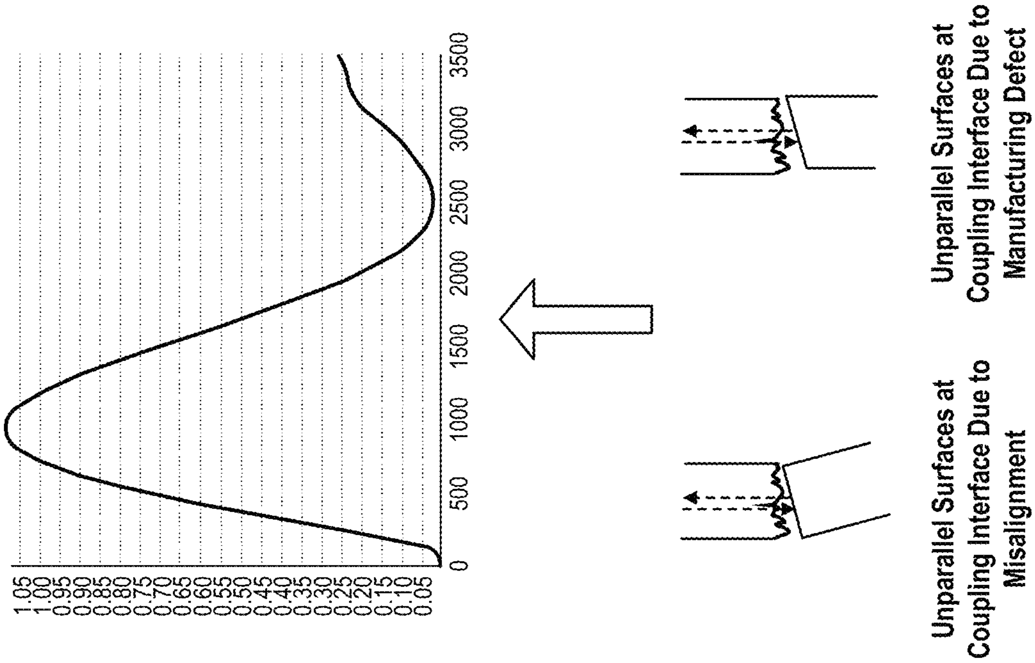
FIG. 8B illustrates how roughening at least one of the unparallel surfaces along the coupling interface—in this case, the distal end of the waveguide—causes interference to be largely, if not entirely, mitigated.

FIG. 8B illustrates how roughening at least one of the unparallel surfaces along the coupling interface—in this case, the distal end of the waveguide—causes interference to be largely, if not entirely, mitigated. This has been found to occur regardless of whether the "unparallelness" is caused by misalignment or manufacturing defect. At a high level, the roughening causes the light emitted from the distal end of the waveguide to be more highly dispersed upon leaving or entering the waveguide. This mitigates the interference that is caused by locating the distal end of the waveguide in close proximity to the proximal end of the monolithic substrate. However, such an approach is generally unnecessary for interferometric sensing systems in which the distal end of the waveguide is spaced apart from the proximal end of the monolithic substrate (e.g., by at least 2 μm). This is because greater dispersal of light leaving the waveguide is generally undesirable if the distance between the distal end of the waveguide and the proximal end of the monolithic substrate is greater. Simply put, the greater the distance between those components, the more desirable it is for the light leaving the waveguide to be roughly collimated so that it reaches the monolithic substrate with minimal intensity loss.

REMARKS

The foregoing description of various embodiments of the technology has been provided for the purposes of illustration and description. It is not intended to be exhaustive or to limit the claimed subject matter to the precise forms disclosed.

Many modifications and variations will be apparent to those skilled in the art. Embodiments were chosen and described in order to best describe the principles of the technology and its practical applications, thereby enabling others skilled in the relevant art to understand the claimed subject matter, the various embodiments, and the various modifications that are suited to the particular uses contemplated.

What is claimed is:

1. A method for manufacturing an interferometric sensing system, the method comprising:

acquiring a waveguide to be interconnected between a light source, a detector, and a monolithic substrate;

treating a first end of the waveguide such that roughness of a surface along the first end of the waveguide falls within a predetermined range of values;

optically coupling the first end of the waveguide to a first end of the monolithic substrate such that the waveguide and the monolithic substrate physically contact each other; and optically coupling a second end of the waveguide to the light source and the detector.

2. The method of claim 1, wherein said treating involves applying a coated abrasive to the first end of the waveguide.

3. The method of claim 2, wherein the coated abrasive includes a layer of abrasive grains that are attached to a substrate.

4. The method of claim 3, wherein the abrasive grains are sand, aluminum oxide, zirconium, ceramic, silicon carbide, or garnet.

5. The method of claim 3, wherein the abrasive grains have a grit number of at least P400.

6. The method of claim 1, wherein said treating involves subjecting the first end of the waveguide to a sandblasting procedure.

7. The method of claim 1, wherein said treating involves subjecting the first end of the waveguide to an acid etching procedure.

8. The method of claim 1, wherein the predetermined range of values is 0.5 micrometers to 10 micrometers in surface roughness, which is defined as an average of profile height deviation from a mean line across the first end of the waveguide.

9. The method of claim 1, further comprising:

treating the first end of the monolithic substrate such that roughness of a surface along the first end of the monolithic substrate falls within the predetermined range of values.

* * * * *